No. 735,114. PATENTED AUG. 4, 1903.
A. KELLER.
DAMPER FOR MUSIC BOXES.
APPLICATION FILED APR. 22, 1903.
NO MODEL.
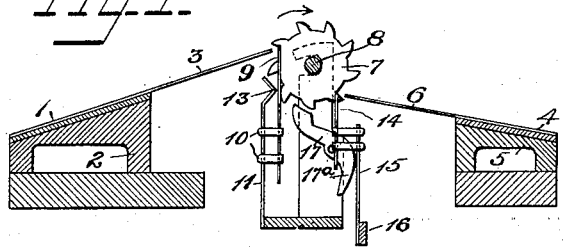
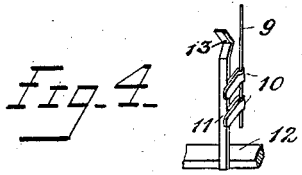
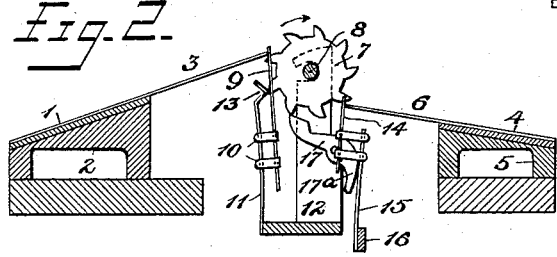
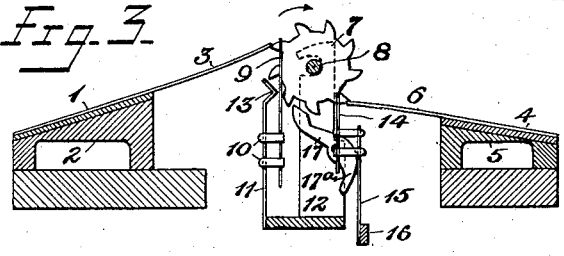
Witnesses
Geo. V. Rasmussen
Inventor
Alfred Keller,
By his Attorney No. 735,114. Patented August 4, 1903.

UNITED STATES PATENT OFFICE.

ALFRED KELLER, OF ST. CROIX, SWITZERLAND, ASSIGNOR TO LOUIS PHILIPPE MERMOD, GUSTAV ALFRED MERMOD, AND LEON MARCEL MERMOD, COPARTNERS TRADING AS MERMOD FRÈRES, OF ST. CROIX, SWITZERLAND.

DAMPER FOR MUSIC-BOXES.

SPECIFICATION forming part of Letters Patent No. 735,114, dated August 4, 1903.

Application filed April 22, 1903. Serial No. 153,734. (No model.)

*To all whom it may concern:*

Be it known that I, ALFRED KELLER, a citizen of Germany, residing at St. Croix, canton of Vaud, Switzerland, have invented certain new and useful Improvements in Dampers for Music-Boxes, of which the following is a full, clear, and exact description.

My invention relates to dampers for musical boxes, and particularly that type of boxes in which a musical comb is provided. These combs have the usual tongues or teeth tuned to the desired scale, and these teeth are picked by suitable devices and set in vibration in the proper order to produce the desired tune. Preparatory to each picking of a tooth it is essential that the vibrations of the tooth shall be checked. It is therefore my purpose and object to provide a simple and inexpensive damping mechanism which will effectively accomplish this end.

In the drawings, Figure 1 is an elevation, partly in section, of my invention as employed in connection with a box fitted with two combs. Fig. 2 is a similar view showing a different position from Fig. 1. Fig. 3 is a similar view showing another position. Fig. 4 is a perspective view of a damper constructed to operate on one of the combs shown in Figs. 1, 2, and 3. Fig. 5 is a perspective view of the damper adapted to operate upon the other comb shown in said figures.

I have not illustrated the entire mechanism of the musical box, but only such parts as are essential to a full and clear understanding of my invention.

1 is a body of a comb mounted upon a suitable base 2. 3 is one of the tongues or teeth on the comb-body 1. 4 is the body of another comb, mounted upon a suitable base 5, and 6 is one of the tongues or teeth on the comb-body 4. The picking device in the construction shown comprises what is termed a "star-wheel" 7, pivotally mounted at 8 and revolved at the proper time in any well-known manner—for example, by means of a pin-disk, such as in common use. The pin-disk is not shown, since the construction is well known. The comb-tongues 3 6 are so placed relatively to the points on the star-wheel 7 that the rotation of the star-wheel will set them in vibration.

The damping mechanism—that is, the mechanism by which the vibration of the comb-tongues is checked—is constructed substantially as follows: Reference will first be made to the damper arranged to check the vibration of the comb-tongue 3. This damper comprises a flexible wire 9, which may be secured in any well-known manner—for example, by means of clips 10 10—to a yielding spring-support 11, which may be mounted at one end on a base 12. The free end of the spring-support 11 is provided with an integral cam or shoulder 13, which projects into the path of movement of the points on the star-wheel 7. It will be observed that the damper 9 is mounted on a yielding portion of the spring-support 11. By this means the operative end of the damper may be brought into engagement with the end of the comb-teeth 3 at the proper time to effectively check the vibrations therein.

This damper 9 is operated as follows:

In Fig. 1 it will be seen the cam-shoulder 13 stands between two of the projections on the star-wheel 7. It may be assumed that the star-wheel is to be turned in the direction of the arrow. When so turned, the star-wheel point immediately below and next to the cam 13 will engage with the same and move it to the position shown in Fig. 2. By this means the spring-support 11 is pressed back, at the same time moving back the end of the damper 9 until it engages with the tooth 3, as shown, checking any vibration therein. Simultaneously the star-wheel point immediately above the shoulder will have approached the end of the comb-tooth 3 preparatory to picking it and setting it in vibration again. When this point engages the tongue, it springs it up into the position shown in Fig. 3, at which instant the point referred to previously as engaging the shoulder 13 becomes freed from said shoulder and allows the spring-support 11 to resume its normal position, releasing the damper 9 from engagement with the tongue. The comb-tongue is then vibrated, when the point on the star-wheel disengages or becomes freed therefrom. The parts then assume the position shown in Fig. 1. These three views, Figs. 1, 2, and 3, illustrate consecutive steps in the operation of the mechanism.

The damper for checking the vibrations in the comb-tongue 6 comprises a flexible wire 14, similar to the wire 9, mounted upon a flexible support 15, the latter being mounted upon a suitable base 16. Because of the peculiar location of this damper and its position relatively to the star-wheel a separate cam 17 is substituted in this instance in place of the integral cam 13, such as employed in connection with the flexible support 11. This cam 17 is pivoted to the standard or base 12, and it has a tail or extension 17ª, which bears against the spring-support 15. The upper end of the lever 17 lies adjacent to the star-wheel and in the path of movement of the points thereon.

Starting with Fig. 1, it will be seen that the damper 14 is free from tooth 6. When the star-wheel is revolved, one of its points engages with the upper end of the cam 17, swinging it into the position indicated in Fig. 2, whereupon the tail 17ª engages the flexible support 15, pressing it back until the end of the damper 14 engages with the end of the tongue 6, checking its vibration. As soon as this particular star-wheel point becomes freed from the lever the damper springs back to its normal position. (Shown in Figs. 1 and 3.) Simultaneously one of the teeth on the star-wheel may be in engagement with the tongue 6, which may be set in vibration as soon as said tooth is disengaged therefrom. This occurs when the star-wheel has turned from the position shown in Fig. 3 to the position shown in Fig. 1. It will be seen that the damper in each instance is a fine flexible wire which is arranged to bear against the end of the comb-tongue at the proper moment. The support in each instance is the spring-support, and the method of connecting the dampers to the spring-support in each instance is substantially the same and affords a simple and efficient means of assembling and adjusting the parts, so that they will perform their functions at the proper time and in the most desirable manner.

The cams 13 and 17 both coöperate with their respective damper-supports in such a manner as to move said supports in line with the comb tongues or teeth, so that the dampers carried by each of said supports, respectively, will be pressed into engagement with said tongues for the purpose set forth. It will be seen that this arrangement results in great compactness, since there is no lateral movement of the parts requiring space in which to operate. Furthermore, the dampers operating tangentially relatively to the arc of movement of the comb-tongues will engage said tongues without producing the peculiar buzzing sound common to dampers which engage comb-tongues from below or above.

What I claim is—

1. In a music-box, a comb-tongue, a damper therefor comprising a flexible wire arranged in front of said comb-tongue, a separate yielding support for said wire, and means coöperating with said yielding support and said damper whereby the same may be moved to press said damper against the end of said tongue.

2. In a music-box, a comb-tongue, a damper therefor comprising a flexible wire, a yielding support therefor, a cam coöperating therewith, said damper being arranged in front of said comb-tongue, and means coöperating with said cam to move said support in the same plane as said tongue and to move said damper into engagement with the end of said tongue.

3. In a music-box, a comb-tongue, a damper therefor comprising a flexible wire, a yielding support therefor, a separate cam coacting with said yielding support, and means to move said cam to in turn move said support in the same plane as the comb-tongue and press said wire into engagement with the end of said tongue.

4. In a music-box, a comb-tongue, a damper therefor comprising a flexible wire arranged in front of said tongue, a separate yielding support for said wire, and a star-wheel coöperating with said yielding support to press said wire damper against the end of said tongue.

Signed at Geneva, Switzerland, this 8th day of April, 1903.

ALFRED KELLER.

Witnesses:
L. H. MUNION,
CHARLES KIENLE.